Aug. 5, 1969  O. HAHN  3,459,470
REMOTELY ADJUSTABLE MOTOR DRIVEN REARVIEW MIRROR
Filed March 30, 1964  9 Sheets-Sheet 1

INVENTOR
Otto Hahn

BY
Richard S. Striker
ATTORNEY

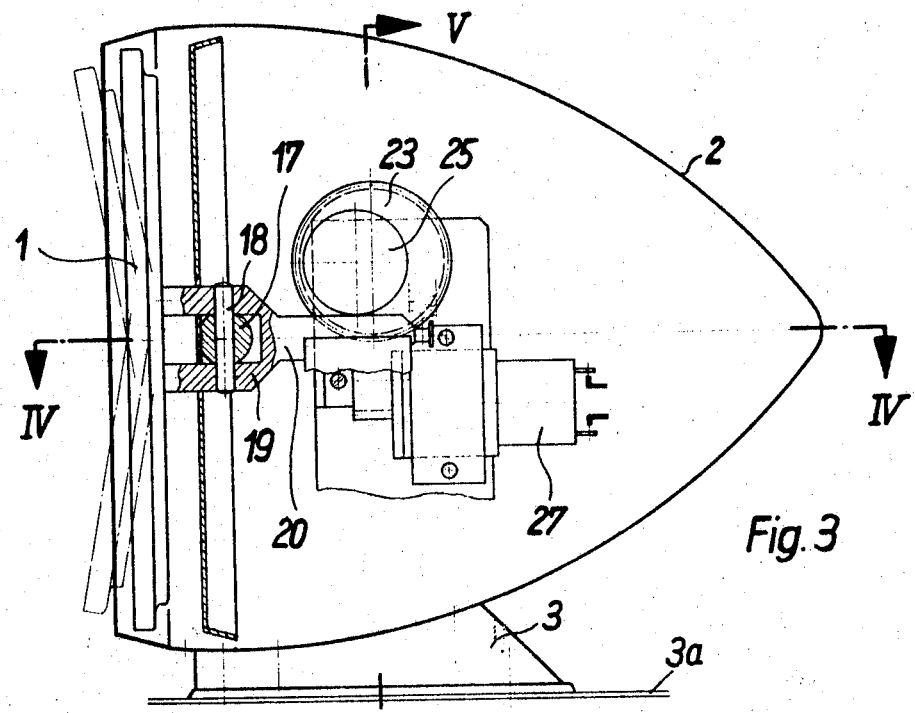
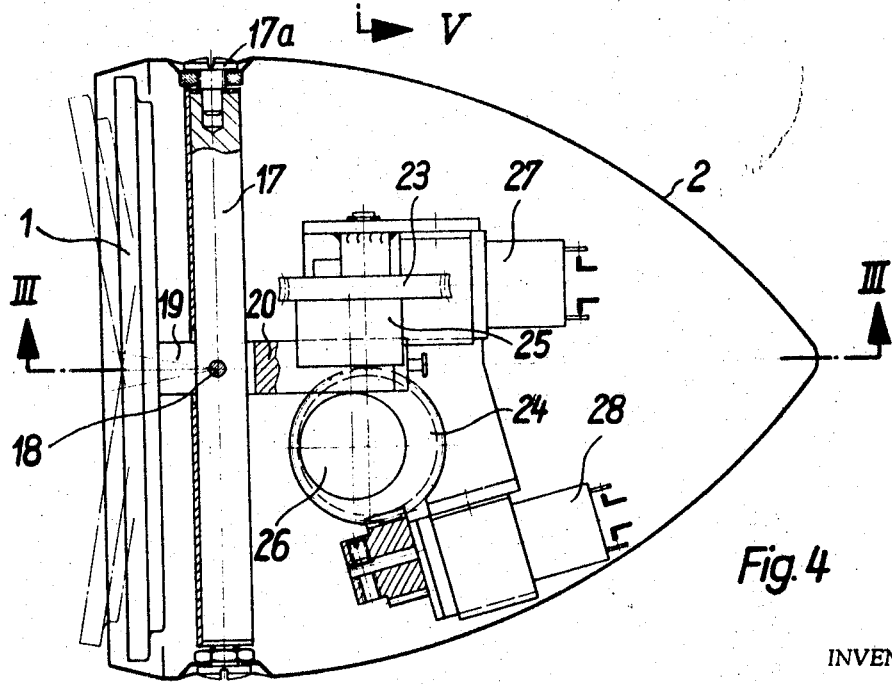

Aug. 5, 1969　　　　　O. HAHN　　　　3,459,470
REMOTELY ADJUSTABLE MOTOR DRIVEN REARVIEW MIRROR
Filed March 30, 1964　　　　　　　　9 Sheets-Sheet 4

INVENTOR
Otto Hahn

BY　Michael J. Striker
ATTORNEY

Aug. 5, 1969　　　　　O. HAHN　　　　　3,459,470
REMOTELY ADJUSTABLE MOTOR DRIVEN REARVIEW MIRROR
Filed March 30, 1964　　　　　　　　　　9 Sheets-Sheet 5
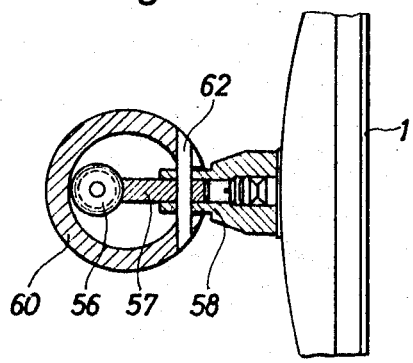
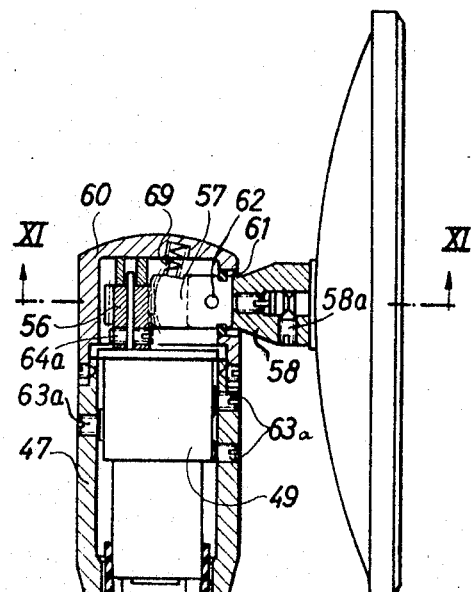
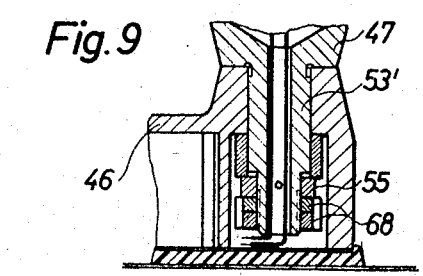
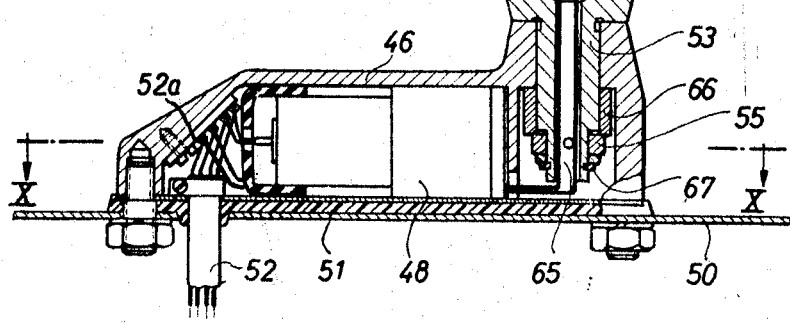
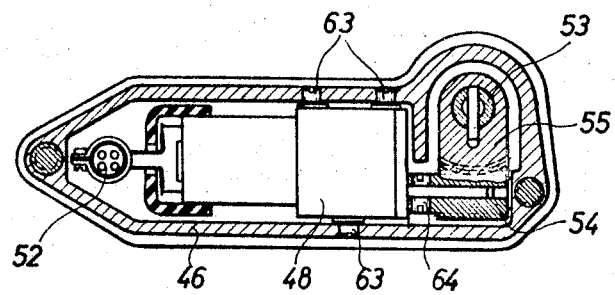
INVENTOR
Otto Hahn
BY
Michael J. Striker
ATTORNEY Aug. 5, 1969     O. HAHN     3,459,470
REMOTELY ADJUSTABLE MOTOR DRIVEN REARVIEW MIRROR
Filed March 30, 1964     9 Sheets-Sheet 6

INVENTOR
Otto Hahn

BY

Michael S. Striker
ATTORNEY

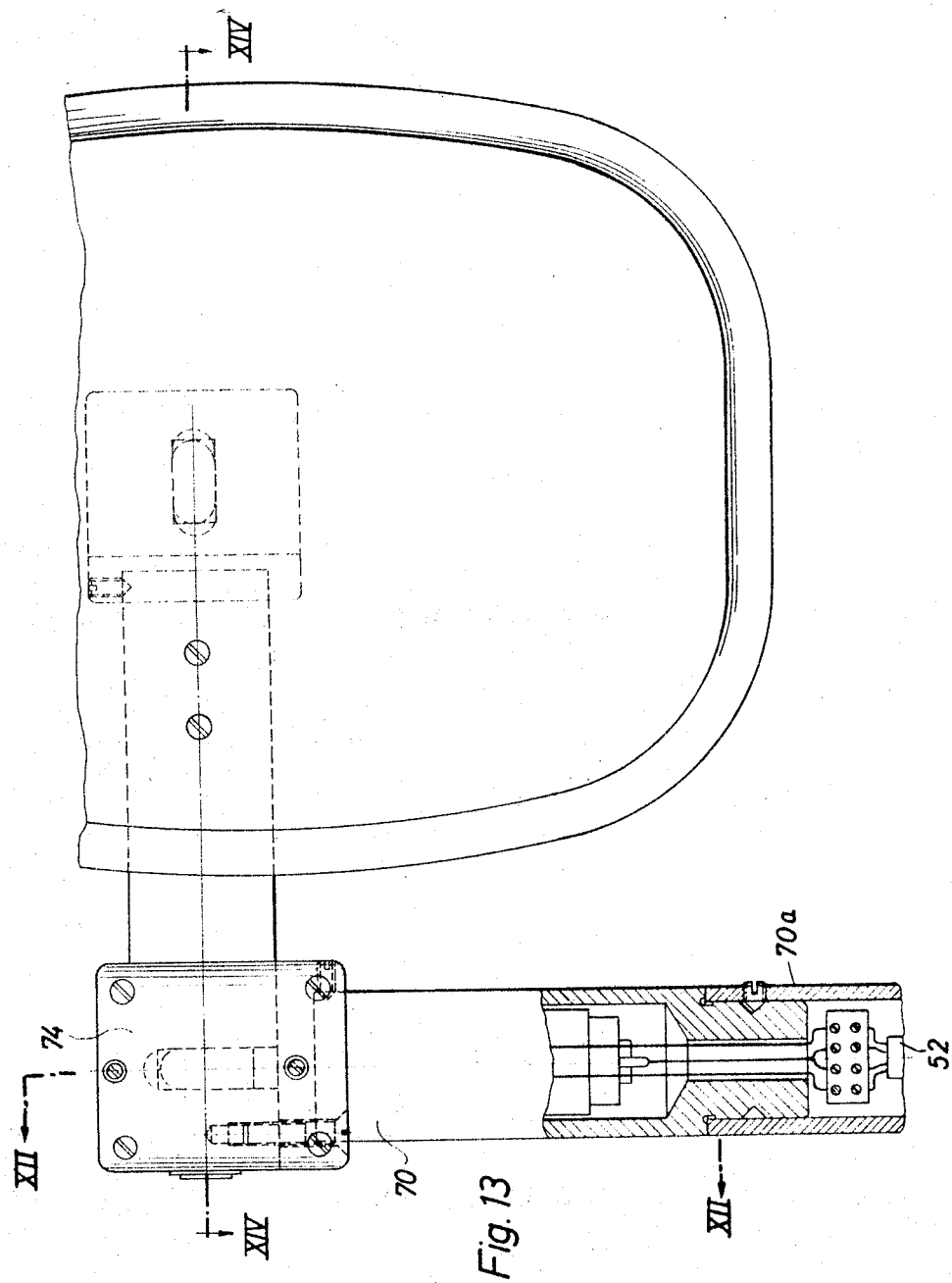

Aug. 5, 1969  O. HAHN  3,459,470
REMOTELY ADJUSTABLE MOTOR DRIVEN REARVIEW MIRROR
Filed March 30, 1964  9 Sheets-Sheet 8
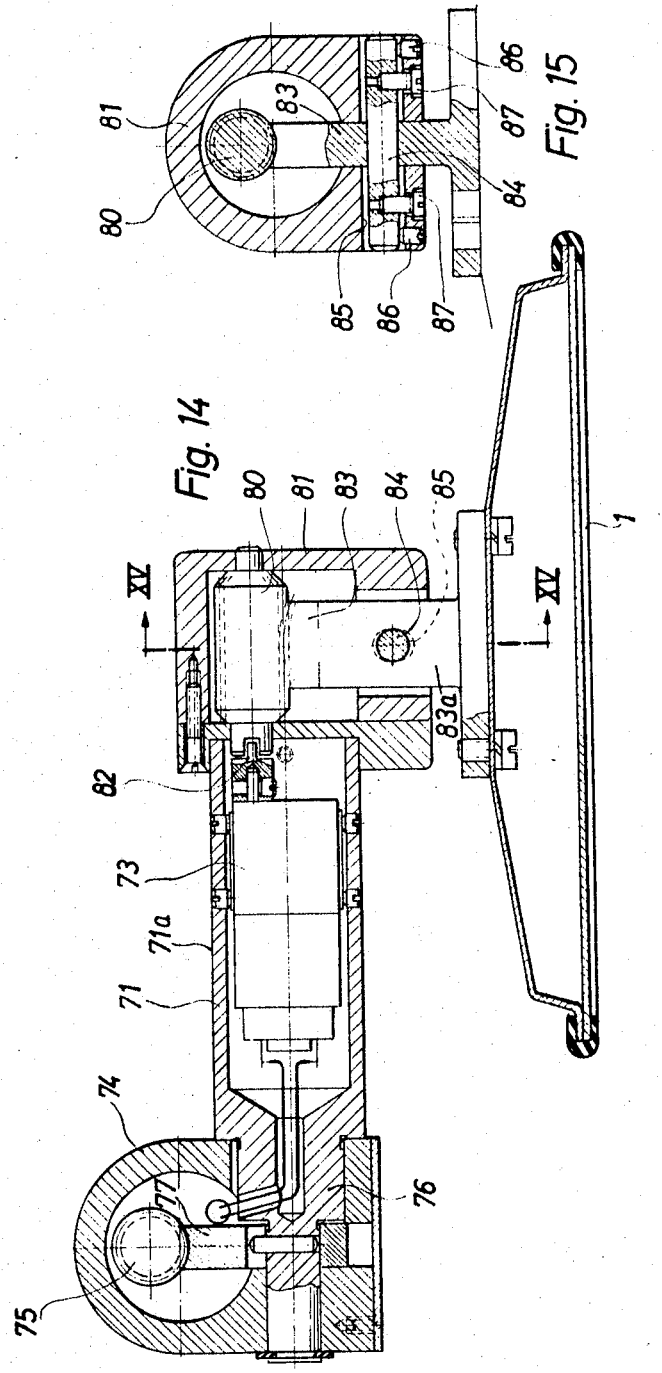
INVENTOR
Otto Hahn
BY
Michael J. Striker
ATTORNEY Aug. 5, 1969   O. HAHN   3,459,470
REMOTELY ADJUSTABLE MOTOR DRIVEN REARVIEW MIRROR
Filed March 30, 1964   9 Sheets-Sheet 9

INVENTOR
Otto Hahn

BY
Michael J. Striker
ATTORNEY

United States Patent Office 3,459,470
Patented Aug. 5, 1969

3,459,470
REMOTELY ADJUSTABLE MOTOR DRIVEN REARVIEW MIRROR
Otto Hahn, Frickenhausen, Wurttemberg, Germany, assignor to Immanuel Maier, Kongen, Wurttemberg, Germany
Filed Mar. 30, 1964, Ser. No. 355,645
Claims priority, application Germany, Apr. 6, 1963,
H 48,779; Oct. 10, 1963, H 50,510; Oct. 23, 1963,
M 58,641
Int. Cl. G02f 1/00
U.S. Cl. 350—289                                4 Claims

ABSTRACT OF THE DISCLOSURE

A rearview mirror is mounted on interconnected housing parts which are respectively turned by two motors about vertical and horizontal axes so that the rearview mirror can be placed in any desired position by operation of two switches controlling the two motors.

---

The present invention relates to a rearview mirror arrangement for vehicles, cranes and the like, and more particularly to a rearview mirror which is mounted on the outside of the vehicle and operated by remote control from the driver's seat.

Rearview mirrors of this type are known which are adjusted through a mechanical linkage. However, such an arrangement is practical only for rearview mirrors mounted on the outside of the door next to the driver. Rearview mirrors which are arranged at the greater distance from the driver's seat, for example on the front fender of a car, on superstructure on vessels, or on cranes, cannot be very well controlled by a mechanical linkage.

It is one object of the present invention to overcome this disadvantage of known rearview mirror arrangements, and to provide a rearview mirror on the outside of a car, or other movable structure, which can be easily but precisely adjusted by an operator by remote control.

Another object of the invention is to provide a rearview mirror which can be adjusted by turning movement about two transverse axes by remote control.

Another object of the invention is to provide a rearview mirror controlled by electric motor means mounted on the outside of the vehicle, and controlled by switch means located in the interior of the vehicle.

Another object of the invention is to rotate a rearview mirror slowly by one electric motor about one axis, and by another electric motor about another perpendicular axis.

Another object of the invention is to provide means for simultaneously turning a rearview mirror about two perpendicular axes by remote control.

Another object of the invention is to provide a switch for controlling the movement of a rearview mirror about two perpendicular axes, and to construct the switch in such a manner that its position indicates the direction of rotation of two electric motors controlling the turning movement of the rearview mirror.

Another object of the invention is to lock the rearview mirror in an adjusted position by locking the switch by which the motor means for adjusting the rearview mirror is controlled.

With these objects in view, the present invention relates to a rearview mirror arrangement which is particularly suited for automobiles and other vehicles, boats, cranes and like movable structures. One embodiment of the present invention comprises a rearview mirror, support means for mounting the rearview mirror on a vehicle movable between a plurality of adjusted positions in which the mirror is angularly displaced about two axes extending at right angles to each other, electric motor means connected to the mirror, and switch means controlled by the operator and connected with the motor means.

When the operator actuates the switch means, he controls the forward or rearward movement of the rearview mirror about one or the other of the two perpendicular axes, and when the operator stops the motor means by operation of the switch, the mirror stops in an adjusted position. The switch is advantageously locked in a position in which the motor means is not energized, so that no accidental displacement of the rearview mirror is possible.

In one embodiment of the invention, one motor is provided for turning the rearview mirror about one axis, and another motor turns the rearview mirror with the first motor about a second axis pependicular to the first axis.

The rearview mirror is supported in a housing on a universal joint which preferably includes two crossing shafts, or a spherical ball and socket joint. In one embodiment of the invention, the device has one housing for the mirror and one motor, and another housing which is mounted on the vehicle and envelopes another motor for turning the first housing together with the first motor and the rearview mirror.

In the preferred embodiment of the invention, each of the housings includes two parts which are detachably connected with each other, one housing part enveloping a reduction transmission, and the other housing part the corresponding motor whose shaft is connected by a coupling to the reduction transmission so that the two housing parts can be detached from each other and attached to each other in a very simple manner.

Direct current motors, or alternating current motors of small size and power can be used for adjusting the rearview mirror, and motors operating at a low rotary speed are particularly suited for this purpose since in this manner the ratio of the reduction transmission between the motor and the rearview mirror can be small.

In one embodiment of the invention, the rearview mirror is simultaneously turned about the two perpendicular axes, while in other embodiments of the invention, the mirror is turned about one axis by a motor in the first housing, and this first housing is turned by another motor about a second perpendicular axis.

The two motors are preferably controlled by the operator by means of a switch movable between four positions of which two positions effect movement of one motor in opposite direction, and two other positions ecect rotatin of the other motor in two opposite directions. In an inoperative position, the motors are not energized, and consequently the rearview mirror remains in its adjusted position, particularly if the switch is locked in accordance with the present invention in the inoperative position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a vertical sectional view taken on line III—III in FIG. 4 and illustrating another embodiment of the invention employing two motors;

FIG. 4 is a horizontal sectional view taken on line IV—IV in FIG. 3;

FIG. 8 is a vertical central sectional view illustrating a fourth embodiment of the invention;

FIG. 9 is a fragmentary vertical sectional view illustrating a modification of the construction shown in FIG. 8;

FIG. 10 is a horizontal sectional view taken on line X—X in FIG. 8;

FIG. 11 is a horizontal sectional view taken on line XI—XI in FIG. 8;

FIG. 13 is an elevation, partially in vertical central section, and illustrating a fifth embodiment of the invention;

FIG. 14 is a horizontal sectional view taken on line XIV—XIV in FIG. 13;

FIG. 15 is a fragmentary vertical sectional view taken on line XV—XV in FIG. 14;

Figure 1:
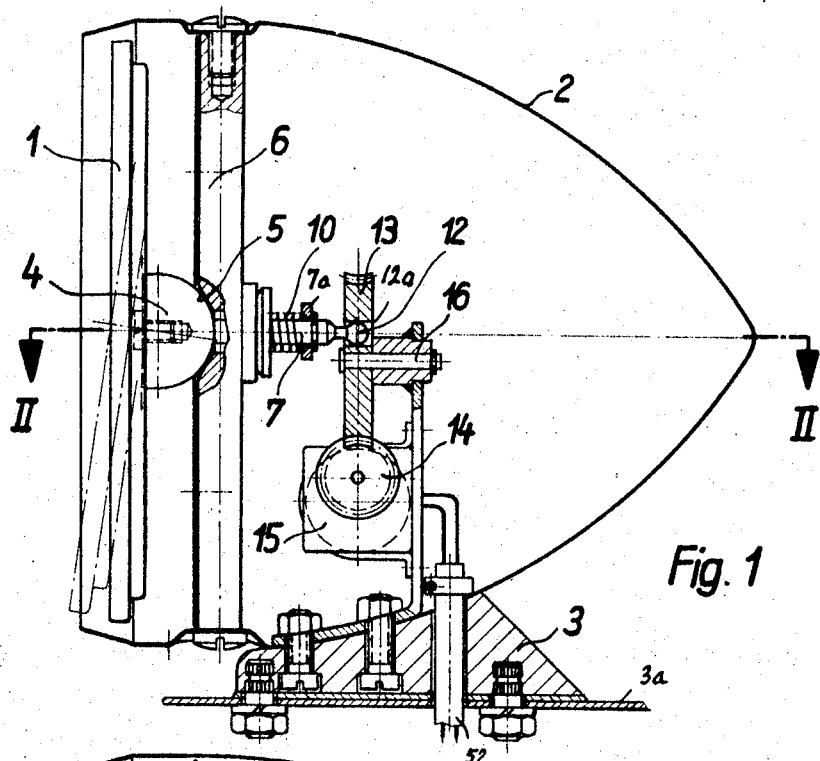
FIG. 1 is a vertical sectional view taken on line I—I in FIG. 2 and illustrating a first embodiment of the invention employing a single motor.

Referring now to the drawings, FIGS. 1 to 7 illustrate three embodiments of the invention which are particularly suited for vehicles operating at high speed so that the rearview mirror 1, and the controlling motor are advantageously mounted within a streamlined housing 2. Housing 2 is secured by screws to a base member or bracket 3 which is detachably secured to a portion 3a of the vehicle body, for example to a forwardly located portion of a front fender where the rearview mirror can be observed by the driver of the car while looking forwardly along the road. It will be understood that in arrangements where the rearview mirror is mounted on the car door to permit manual adjustment by the driver through the window in the door, the driver is compelled to look away from the road when he wishes to perceive the image of the rearview mirror. The fender 3a need not necessarily be the fender on the side of the driver, but can also be the fender on the other side of the car. Since the arrangement of the present invention permits the adjustment of the rearview mirror from the driver's seat, the rearview mirror on the side of the car remote from the driver can be easily adjusted, whereas manually adjustable rearview mirror in such a position requires two persons for adjustment, and can be adjusted only while the car is at a standstill.

Figure 2:
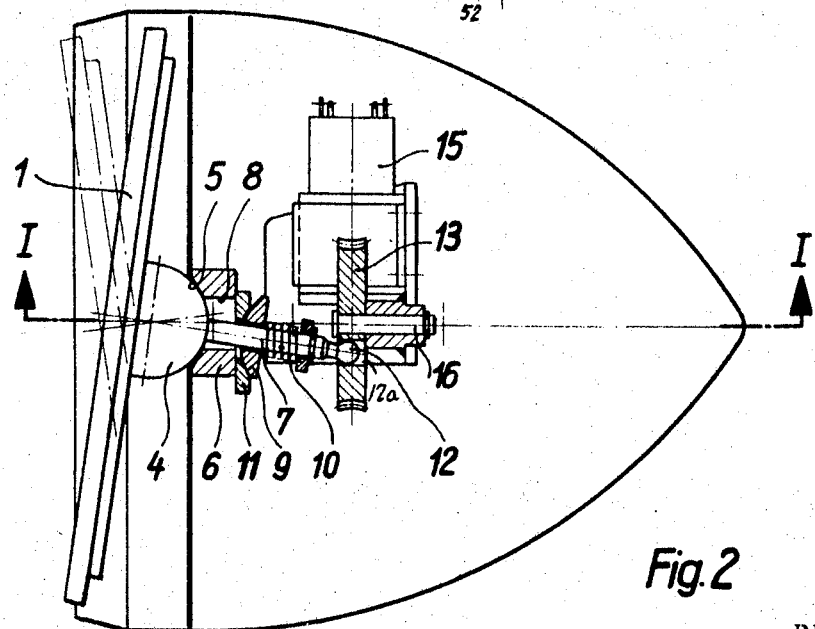
FIG. 2 is a horizontal sectional view taken on line II—II in FIG. 1.

Referring now to the embodiment of FIGS. 1 and 2, a spherical member 4 is secured to the backing plate of the mirror 1 and is mounted in a spherical socket seat 5 of a support rod 6 which is secured to housing 2. A control member 7 is secured to the spherical member 4, and therethrough to mirror 1, and projects through an opening 8 in support 6 into the interior of housing 2 where it terminates with a ball-shaped head 12. An annular member 9 having a spherical surface surrounds control member 7 and is urged by a spring 10 abutting a fixed ring 7a against the corresponding spherical seat in a slide plate 11 which is slidable along the rear surface of support 6. The pressure of spring 10 holds spherical member 4 in the position slidably abutting seat 5 so that by turning of control member 7, mirror 1 can be turned about transverse axes between adjusted positions.

In accordance with the embodiment illustrated in FIGS. 1 and 2, a single motor 15 is mounted on a bracket in housing 2, and connected by a cable 52 to the battery of the car, and to a switch located in the interior of the car in the region of the driver's seat. As will be explained with greater detail with reference to FIG. 18, the switch is adapted to cause rotation of the motor in opposite directions.

The shaft of motor 15 drives a worm gear 14 meshing with a worm wheel 13 which has a circumferentially extending slot 12a in which the head 12 of control member 7 is located. During rotation of motor 15, the head 12 will be moved along a circular path so that control number 7 and the central axis of mirror 1 will move along the surface of an imaginary cone. Mirror 1 turns during such a movement simultaneously about two transverse axes and scans a frusto-conical space located rearwardly of mirror 1 and of the car. The angle of the scanned space depends on the radius of the circle along which head 12 moves, and consequently on the radius of the part-circular slot 12a in relation to the main axis of the housing 2 along which shaft 16 of worm wheel 13 is located. The angular composite displacement of the mirror can be selected in such a manner that the possible adjustment will suffice for all practical purposes, and particularly if the position of the mirror is selected in such a manner that the mirror is located in one position in a vertical plane perpendicular to the longitudinal axis of the car.

The embodiment of FIGS. 1 and 2 has the advantage that only a single motor is required for adjusting the rearview mirror. However, a more accurate adjustment can be achieved by the use of two motors each of which adjusts the mirror about one of two axes which are perpendicular to each other.

Figure 5:
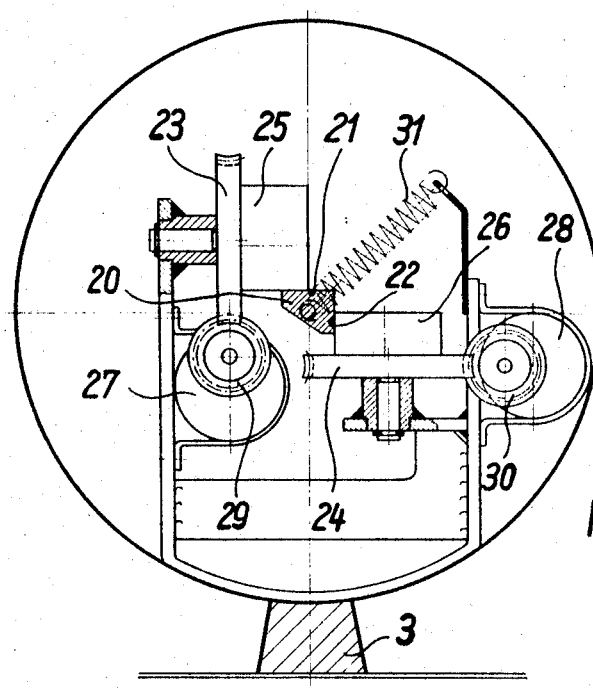
FIG. 5 is a cross sectional view taken on line V—V in FIG. 3.

In the embodiment illustrated in FIGS. 3 to 4, the rearview mirror 1 is fixedly secured to a control member 19 whose front end is forked and embraces a vertical shaft 17 which is mounted on a pair of pins 17a for turning movement about a horizontal axis in housing 2 to which threaded portions of pins 17a are secured. Another shaft 18 passes through a bore in shaft 17 and has ends located in bores of the forked end portion of control member 19. Consequently, control member 19 with mirror 1 can turn about the vertical axis of shaft 18, and also about the horizontal axis of shaft 17. The rear end portion of control member 19 is constructed as a cam follower whose cross-section is best seen in FIG. 5, which is urged by a spring 31 to a position abutting two rotary cams 25 and 26. Cam 25 is engaged by a flat surface 21, and cam 26 is engaged by a flat surface 22 of cam follower portion 20 of control member 19.

Motor 27 is mounted on a bracket in housing 2, and drives a worm wheel 29 meshing with a worm wheel 23 secured to cam 25. Motor 28 has a shaft driving a worm gear 30 meshing with a worm wheel 24 secured to cam 26.

First and second switches in the region of the driver's seat respectively control motors 27 and 28 so that each motor can be independently started to rotate either in a forward direction, or in a reverse direction.

Assuming that motor 27 is started, cam 25 will turn, and assuming a counterclockwise direction of rotation in FIG. 3, due to the eccentricity of the circular cam 25 with respect to the axis of rotation of worm gear 23, cam follower portion 20 will be moved downward, so that mirror 1 will be turned about the horizontal axis of shaft 17 of the universal joint 17, 18.

If motor 28 is started, cam 26 will urge cam follower 20 to turn about shaft 18, and control member 19 will turn mirror 1 at the same time about the vertical axis of shaft 18. In the event that both motors are simultaneously operated, the universal joint 18, 17 will permit a composite movement of mirror 1 about two perpendicular axes to adjusted positions. As will be explained hereinafter with reference to FIGS. 16 to 18, the switch by which the operator controls the adjustment of the rearview mirror from the interior of the car, is preferably of such a construction as to permit simultaneous energization, or separate individual energization of the two motors. The two cams 25 and 26 can be simultaneously operative, since spring 31, which extends at an angle of 45° to surfaces 21 and 22, urges cam follower 20 against both cams 25 and 26.

Figure 6:
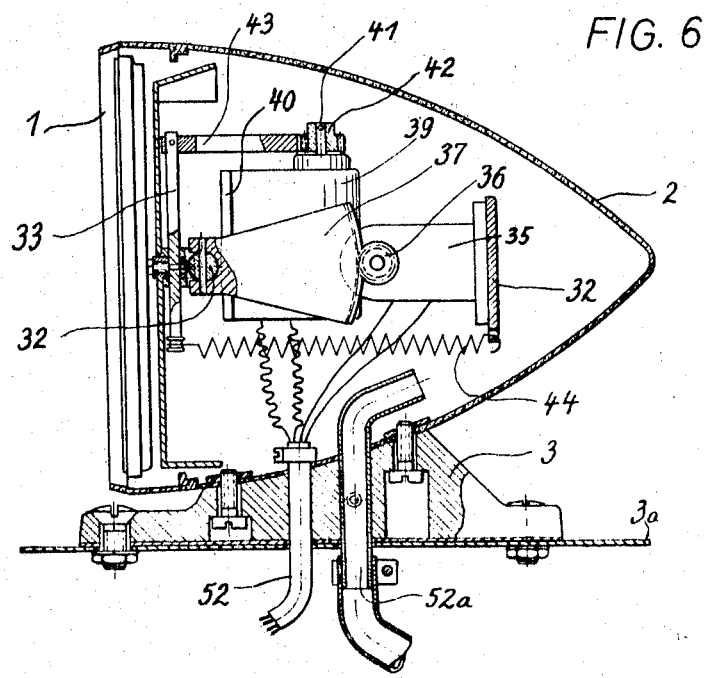
FIG. 6 is a vertical central sectional view illustrating a third embodiment of the invention.
Figure 7:
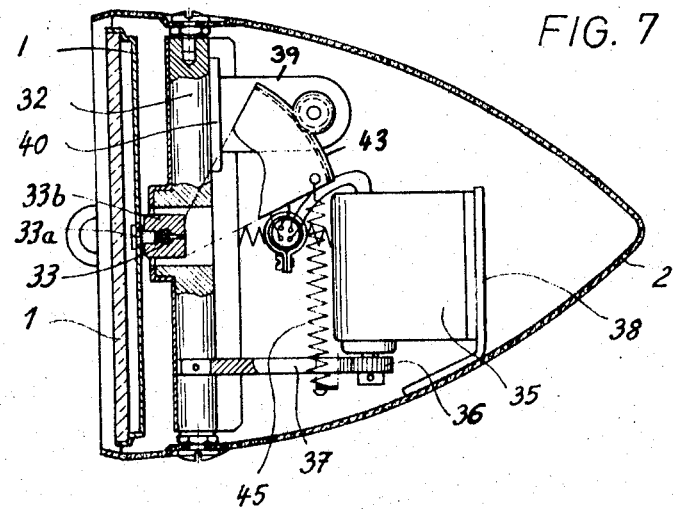
FIG. 7 is a horizontal central sectional view illustrating the embodiment of FIG. 6.
Figure 12:
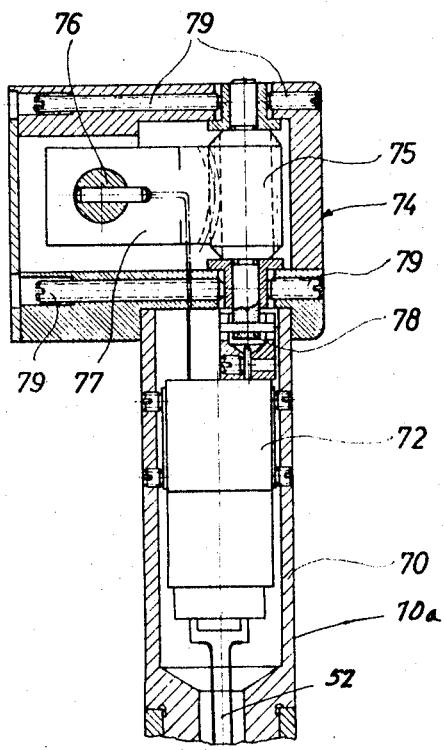
FIG. 12 is a fragmentary vertical sectional view taken on line XII—XII in FIG. 13.

In the embodiment of FIGS. 6 and 7, the base 3 is again mounted on the outside of the car, for example on the fender 3a. The steamlined housing 2 is secured to base 3, and has a first opening for the cable 52 which is connected to the battery, and a second opening for a tube or hose 52a through which warm air from the heating system of the car is conducted into housing 2 in order to prevent freezing of the mechanism by which the rearview mirror is adjusted.

A screw 33a secures the back plate 1a of mirror 1 to a vertical shaft 33 mounted in a block 33b which is secured to a horizontal shaft 32 mounted in housing 2. A gear sector 37 is secured to shaft 32 and meshes with a gear 36 driven by a motor 35 mounted on a bracket 38 in housing 2. When motor 35 is energized, shaft 32 is turned with mirror 1 about a horizontal axis.

A gear sector 43 is secured to the upper end of shaft 33 and meshes with a gear 42 secured by a pin 41 to the shaft of a motor 39 which is secured to a bracket 40 of housing 2. When motor 39 is energized, shaft 33 is turned, and mirror 1 turns about a vertical axis. The cardan-type universal joint 33, 33b, 32 permits a composite movement of mirror 1 about two perpendicular axes when the two motors 35 and 39 are simultaneously energized. Gears 36, 37, 42, 43 constitute two reduction transmissions for reducing the speed of the angular displacement of mirror 1 as compared with the higher speed of the shafts of motors 35 and 39.

In order to avoid play within the gear transmissions, the spring 44 is secured to bracket 38 and to shaft 33, and another spring 45 is secured to gear segment 43 and to a bracket in housing 2, as best seen in FIG. 7.

In the embodiments of FIGS. 3 to 7, two motors are connected to the mirror by universal joints.

In the embodiments illustrated in FIGS. 8 to 11, and 12 to 15, respectively, the mirror is not mounted on a universal joint, but turns about a first axis provided by a supporting housing, which is turnable about a second axis together with the mirror. A second motor is provided for this purpose in a second housing which supports the mirror carrying housing.

Referring now to the embodiment of FIGS. 8 to 11, the rearview mirror 1 has a control member 58 secured thereto which is mounted in a first housing 47 for turning movement about the horizontal shaft 62. As best seen in FIG. 11 shaft 62 is mounted on cap 60 of the substantially tubular housing 47 and passes through corresponding bores in control member 58. A gear sector 57 is secured to control member 58 for turning movement therewith and has a bore through which shaft 62 passes. A threaded pin projects from gear sector 57 and is secured in a bore of control member 58. Mirror 1 has a central pin located in the same bore of control member 58 and secured therein by a small worm screw 58a.

A first motor 49 is mounted in housing 47 and has an output shaft carrying a worm gear 56 meshing with the gear sector 57. Worm screws 63a are provided for adjusting the position of motor 49 in housing 47. Worm gear 56 is mounted on the motor shaft by means of screws 64a. When motor 49 rotates the reduction gear transmission 56, 57, mirror 1 is turned about the horizontal axis of shaft 62.

The upper end of tubular housing 47 is closed by a cap 60 which has the opening 61 through which control member 58 projects into the interior of housing 47. A spring 69 urges gear sector 57 to a position abutting the teeth of worm gear 56 so that play is eliminated.

The lower end of housing 47 has a shaft portion 53 mounted in a corresponding bearing formed in the lower housing 46. Shaft portion 53 has a central bore 65 through which the leads supplying current to motor 49 pass. A worm gear sector 55 is secured to shaft portion 53, as best seen in FIG. 10, and meshes with a worm gear 54 secured by means of screws 64 to the output shaft of a second motor 48 which is located in the lower housing 46. The exact position of motor 48 and its shaft can be adjusted by adjusting screws 63. The lower housing 46 is secured to the outer surface of a body portion 50 of the car, and a cable 52 passes through sheet 50 and sealing plate 51 to connect the motors to the battery of the car. The ends of cable 52 are secured to clamping screws on a connector plate 52a to which wires leading to the motors are clamped.

The longitudinal axis of housing 46 is perpendicular to the vertical axis of housing 47, and also perpendicular to the horizontal axis of shaft 62. Worm gear sector 55 is adjusted in axial direction by a bushing 66 and a holding ring 67.

In the modified construction of FIG. 9, gear sector 55 has an inner thread and is screwed onto a corresponding threaded portion at the end of shaft portion 53', and secured by a pair of nuts 68.

When it is desired to adjust rearview mirror 59 about a vertical axis, motor 48 is energized from the driver's seat by a switch, and turns through the transmission 54, 55, housing 47 with motor 49, control member 58 and mirror 1 about the vertical axis defined by shaft portion 53 of housing 47. When motor 49 is energized, mirror 59 with control member 58 is turned through transmission 56, 57 about a horizontal axis provided by shaft 62. Consequently, the mirror can be turned about two perpendicular axes to any desired adjusted position. As explained above, it is possible to simultaneously energize both motors so that the mirror performs a composite movement turning about two axes simultaneously.

The angular movement of the housing 47 with mirror 1 about the vertical axis is limited by mechanical engagement between gear sector 55 and the walls of housing 46, as best seen in FIG. 10. Corresponding abutments are provided in housing 47, 60 for limiting the movement of gear sector 57 with control member 58 and mirror 1. However, it is also possible to provide limit switches which will disconnect the motors in extreme angular positions of the mirror. When mechanical abutments are provided, slip clutches, not shown, are included into the transmissions so that continued energization and rotation of a motor cannot damage the transmission.

The embodiment illustrated in FIGS. 12 to 15 is particularly suited for very large rearview mirrors of the type used for trucks, railway cars, boats, or cranes. Such a mirror may be mounted on the side of the vehicle remote from the driver. Corresponding to the embodiment described with reference to FIGS. 8 to 11, two housings 70 and 71 are provided. Housing 70 includes a fourth tubular housing part 70a and a third housing part 74. Housing 71 includes a second housing part 71a, and a first housing part 81. Housing part 71a has a shaft end portion 76 mounted for turning movement in a corresponding horizontal bearing in the third housing part of housing 70. The first housing part 81 can be detached from the second housing part 71a, which remains connected to the third housing part 74 of housing 70. The second housing part 71a can be detached together with the third housing part 74 from the fourth housing part 70a.

A cable 52 supplies current to motor 72 which is mounted in housing part 70a. The motor output shaft is connected by a coupling 78 to the shaft of a worm gear 75 which is mounted in housing part 74 and positioned by means of screws 79. Consequently, housing part 74, together with housing part 71a, and if desired with housing part 81, can be detached from housing part 70a while the transmission 75, 77 is disconnected from motor 72. Similarly, a coupling 82 connects the output shaft of motor 73 with the shaft of a worm gear 80 mounted in housing part 81 and meshing with a gear sector 83. Consequently, when housing part 81 is detached from housing part 71a, the coupling 82 disconnects the shaft of motor 73 from worm gear 80, and the transmission is again coupled to the motor shaft when housing part 81 is again attached to housing part 71a.

Gear sector 77 is secured to shaft portion 76 so that housing 71, including housing parts 71a and 81, is turned about the horizontal axis of shaft portion 76 when motor 72 is energized. The rearview mirror 1 is secured to a control member 83a which terminates in the gear sector 83, and which is mounted for turning movement on the vertical shaft 84 supported in housing part 81. When motor 73 is energized, transmission 80, 83 will turn the mirror about the vertical axis of shaft 84 to angularly adjusted positions.

As best seen in FIG. 15, shaft 84 is mounted in elongated bore 85 of housing part 81 and is provided with transverse threaded bores engaged by screws 87 by which the position of shaft 84 can be adjusted. The exact position of shaft 84 is determined by worm screws 86.

Figure 16:
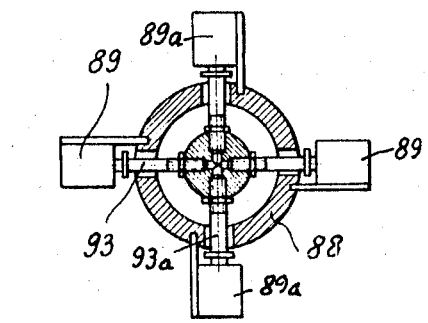
FIG. 16 is a cross-sectional view of a switch for controlling two motors in the embodiment of FIGS. 3 to 15.
Figure 17:
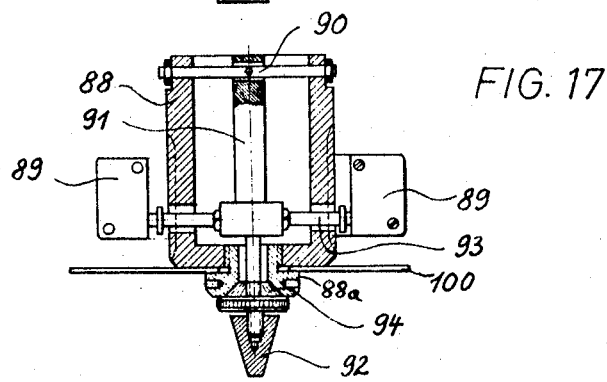
FIG. 17 is a longitudinal sectional view of the switch shown in FIG. 16.

As explained with reference to the various embodiments of the invention, and particularly with reference to the embodiments of FIGS. 3 to 15 in which two motors are provided, switch means are connected to the motors to cause running of each, or both motors in selected forward or reversed directions of rotation. FIGS. 16 and 17 illustrate a switch which is particularly suited for this purpose. The housing 88 of the switch is secured to the dashboard of the car in the region of the driver's seat. Four switches including a first pair of switches 89 and a second pair of switches 89a are arranged equidistant from the illustrated central inoperative position of a switching member 91. Switching member 91 has one end mounted on a universal joint including shaft 90, so that by operation of the button 92, switch member 91 can be angularly displaced about the axes of the shafts. Switch operating rods 93 and 93a respectively cooperate with switches 89 and 89a in four operative positions of switch member 91. However, switch member 91 can also be turned to intermediate positions in which a rod 93a and a rod 93 are displaced so that two switches 89 and 89a are simultaneously actuated.

The front end of switching member 91 is provided with a thread on which a nut 94 is mounted. Nut 94 has a conical portion abutting a corresponding conical seat in a member 88a which is threaded into the switch body 88 and holds the switch on the dashboard plate 100. When nut 94 is tightened, switch member 91 cannot be displaced out of its illustrated central inoperative position, but when nut 94 is loosened, switch member 91 can be turned to one of the operative positions actuating one or two of the switches 89 and 89a.

Figure 18:
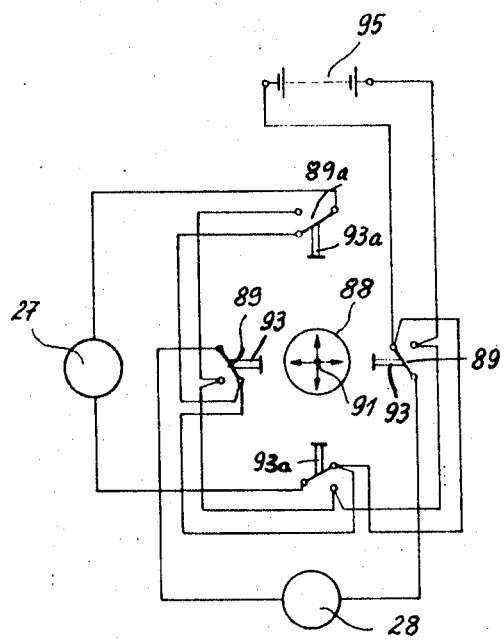
FIG. 18 is a diagram illustrating the electric circuit of the embodiments of FIGS. 3 to 15 as controlled by the switch illustrated in FIGS. 16 and 17.

As best seen in FIG. 18, motors 27 and 28 are respectively connected to switches 89a and 89 in such a manner that, for example, motor 28 will run in one direction of rotation when one switch 89 is actuated by switching member 91, and will run in the opposite direction when the other switch 89 is actuated by switch member 91.

The reference numerals 27 and 28 are applied to the motors in FIG. 18 corresponding to the showing of the motors in FIGS. 3 and 4, but it will be understood that the motors of the other embodiments will be connected to the control switch in the same manner.

Referring to the embodiment of FIGS. 3 and 4, it will be seen that motor 28 accomplishes movement of the rearview mirror about a vertical axis, and consequently in a horizontal plane. The horizontal movement of switch member 91 will suggest to the operator such turning movement of the mirror in a horizontal plane, and the vertical movement of switch member 91 to actuate one of the switches 89a, will suggest to the operator the turning of the mirror about a horizontal axis under control of motor 27 with mirror 1 being displaced out of a vertical plane. In this manner, the switch can be operated by the driver without looking at the switch, and while the driver observes the image reflected by the rearview mirror while the same is turned to adjusted positions, and when the correct adjusted position is found, the driver simply moves the switch member 91 to its central position, and secures the same by locking means 94.

The circuit shown in FIG. 18 includes a battery 95, and motors 27 and 28 are consequently direct current motors.

If stepwise turning of the mirror is preferred, the transmissions between the motors and the turned parts may include a Geneva drive, or instead of the rotary motors, a stepping mechanism operated by electromagnetic means may be provided.

What is claimed as new and desired to be secured by Letters Patent is:

1. A rearview mirror arrangement for a vehicle, crane or the like, comprising, in combination, a first housing means including a first housing part and a second housing part detachably connected with each other; a rearview mirror mounted on said first housing part for turning movement about a first axis; first transmission means located in said first housing part and connected to said rearview mirror; a first motor mounted in said second housing part and having a first shaft; first coupling means connecting said first shaft with said first transmission means so that said first housing part can be detached from said second housing part; second housing means including a third housing part supporting said second housing part for turning movement about a second axis transverse to said first axis so that said rearview mirror can be turned between a plurality of positions angularly displaced in relation to said first and second axes, and a fourth housing part detachably connected with said third housing part and adapted to be mounted on a vehicle; second transmission means mounted in said third housing part connected to said second housing part; second motor means mounted in said fourth housing part and having a second shaft; second coupling means for connecting said second shaft with said second transmission means so that said third housing part can be detached from said fourth housing part; and first and second switches adapted to be mounted in the region of the operator's seat in the vehicle and respectively connected with said first and second motors whereby the position of said rearview mirror can be adjusted by remote control.

2. A rearview mirror arrangement as set forth in claim 1 wherein each of said transmission means includes a gear, and a larger gear sector meshing with said gear.

3. A rearview mirror arrangement as set forth in claim 1 wherein said fourth housing part is a vertical tubular member, and wherein said second housing part is a horizontal tubular member terminating in a horizontal shaft portion mounted for turning movemnt on said third housing part.

4. A rearview mirror arrangemnt as set forth in claim 1 including a shaft supporting said rearview mirror on said first housing part for turning movement about said first axis; and means for adjusting the position of said shaft on said first housing part.

References Cited

UNITED STATES PATENTS 2,471,841   5/1949   Sells.
2,817,005   12/1957   Cameron _____ 240—61.13 X
3,075,073   1/1963   Hildebrecht _____ 240—61.13

DAVID SCHONBERG, Primary Examiner

J. W. LEONARD, Assistant Examiner

U.S. Cl. X.R.

200—6